United States Patent [19] [11] 4,202,278
Wadenhed [45] May 13, 1980

[54] MOVABLE DISTRIBUTION CONTAINER
[75] Inventor: Gustav Wadenhed, Helsingborg, Sweden
[73] Assignee: Tradgardshallen i Helsingborg Planteringsvagen, Helsingborg, Sweden
[21] Appl. No.: 879,389
[22] Filed: Feb. 21, 1978
[30] Foreign Application Priority Data
Feb. 23, 1977 [SE] Sweden ................ 7702017
[51] Int. Cl.² ............... A47B 11/00; A47F 5/10
[52] U.S. Cl. ............... 108/102; 108/90; 108/111; 211/149; 248/172; 280/79.3
[58] Field of Search ........... 280/638, 35, 42, 79.3; 248/172, 173; 211/201, 149; 108/102, 111, 90
[56] References Cited
U.S. PATENT DOCUMENTS

| | | | |
|---|---|---|---|
| 905,737 | 12/1908 | McCombe | 108/102 X |
| 1,895,535 | 1/1933 | Brecht | 280/79.3 X |
| 2,419,422 | 4/1947 | Schulein | 280/79.3 X |
| 2,441,721 | 5/1948 | Schroeder | 108/102 X |
| 2,579,448 | 12/1951 | Carrera | 280/35 |
| 2,888,305 | 5/1959 | Perry | 108/102 X |
| 3,221,677 | 12/1965 | Kerr | 108/102 |
| 3,782,748 | 1/1974 | Poland | 280/35 |
| 3,955,511 | 5/1976 | Bak | 248/172 |

FOREIGN PATENT DOCUMENTS 1452662 10/1976 United Kingdom ............ 248/172

Primary Examiner—James T. McCall
Attorney, Agent, or Firm—Fleit & Jacobson

[57] ABSTRACT

A movable distribution container that is adjustable to vary its width. The container has a frame of generally right-angled parallelepipedic shape that supports a plurality of juxtaposed shelves. The vertical corners of the frame are defined by vertically-extending members, pairs of which are interconnected to form the sides of the frame. The sides are adjustably interconnected to each other. Each side supports one-half of a shelf, with the lowermost half being rigidly connected to the vertical members and the upper halves being adjustable. The shelf halves extend towards each other to define a support surface. The distance between the shelf halves is varied by changing the distance between the interconnected sides. Wheels are connected to the frame to facilitate its movement.

8 Claims, 19 Drawing Figures

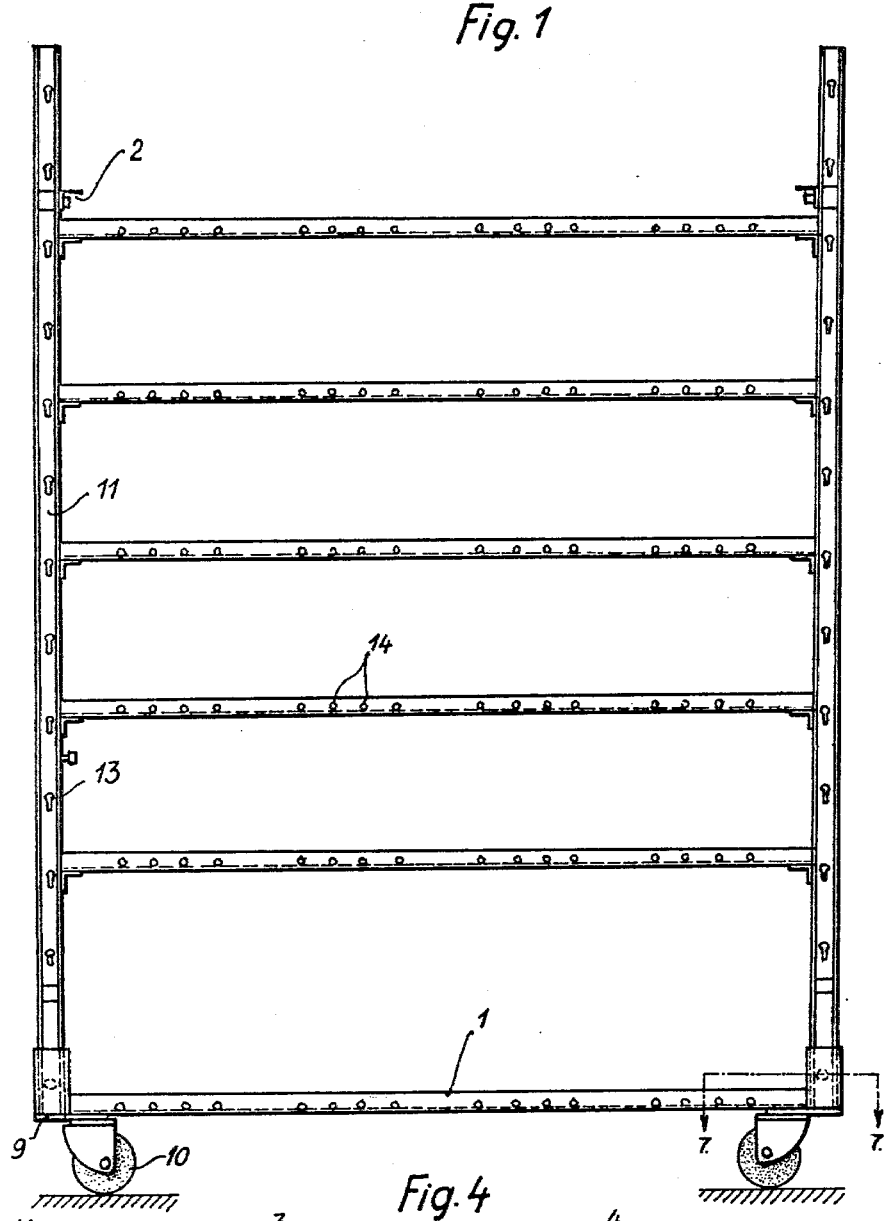
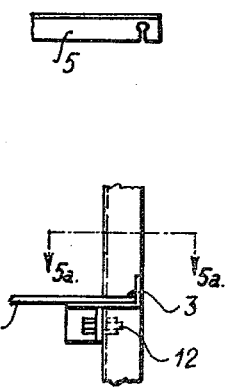
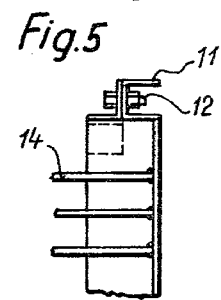
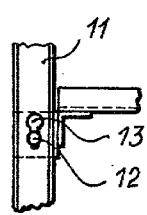
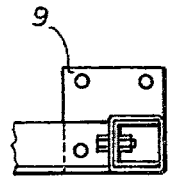
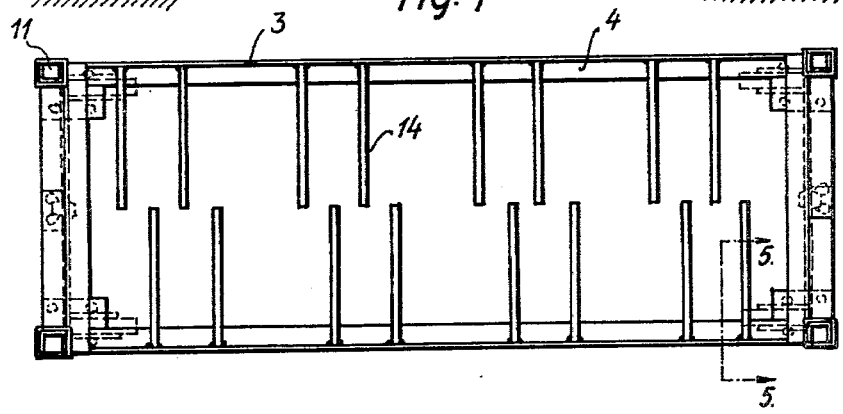

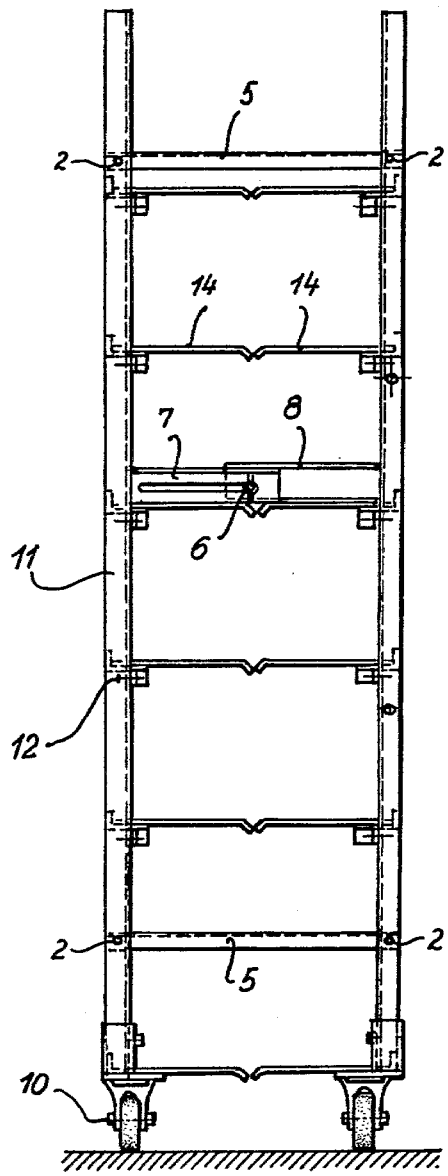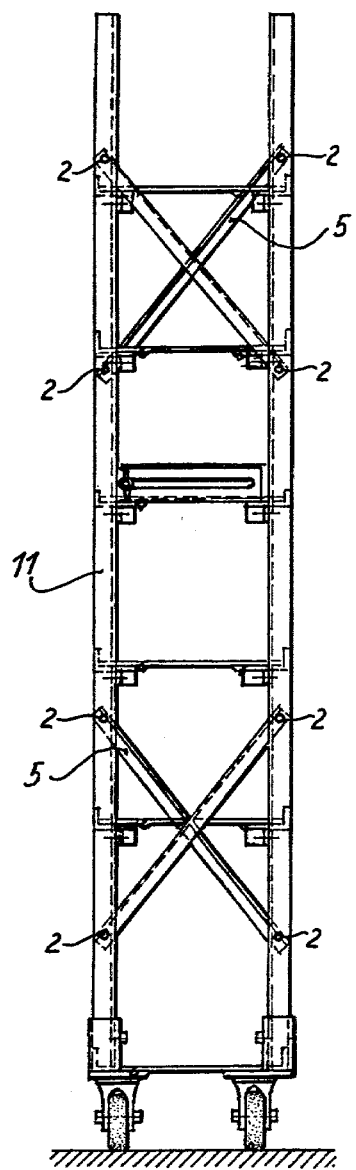

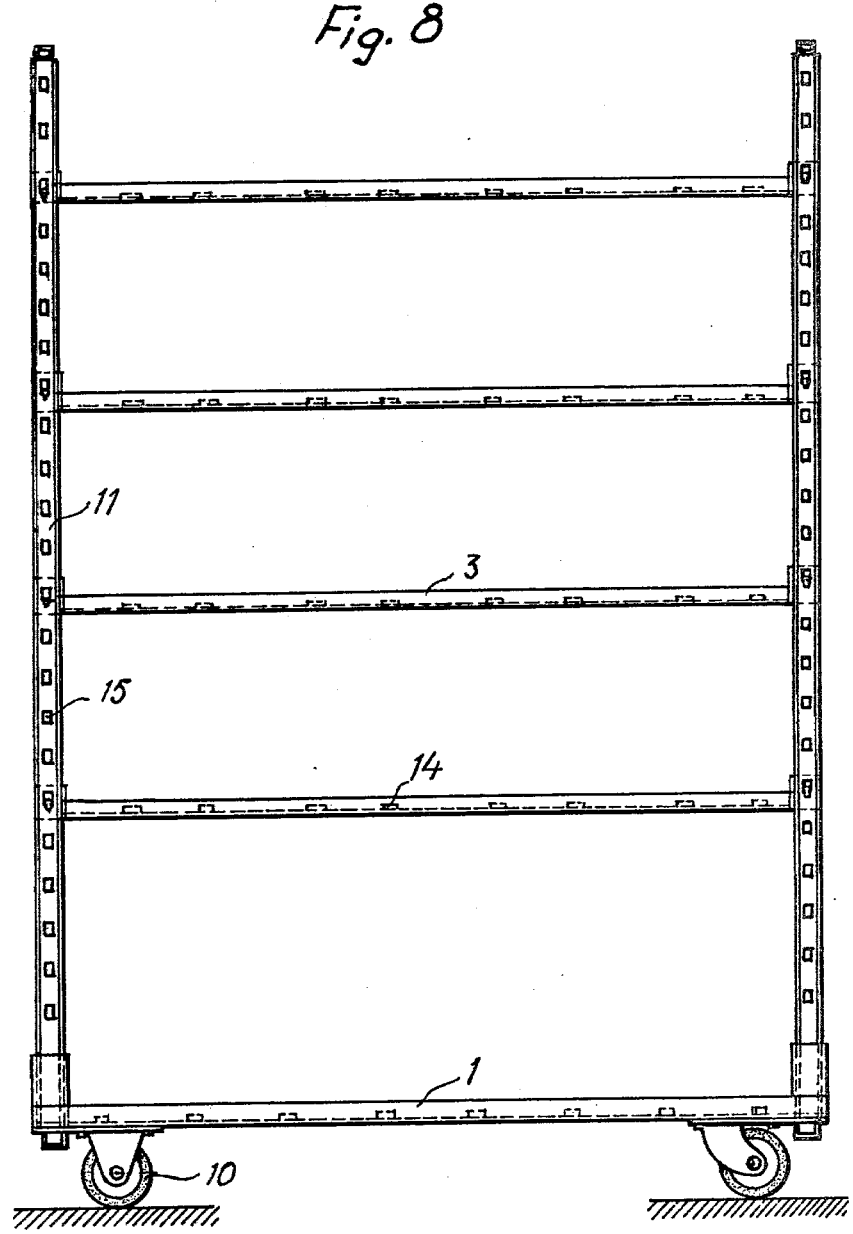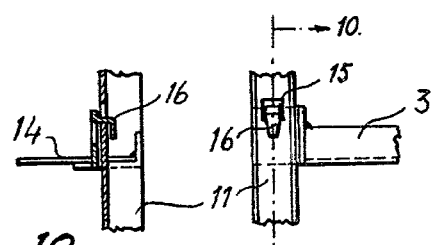

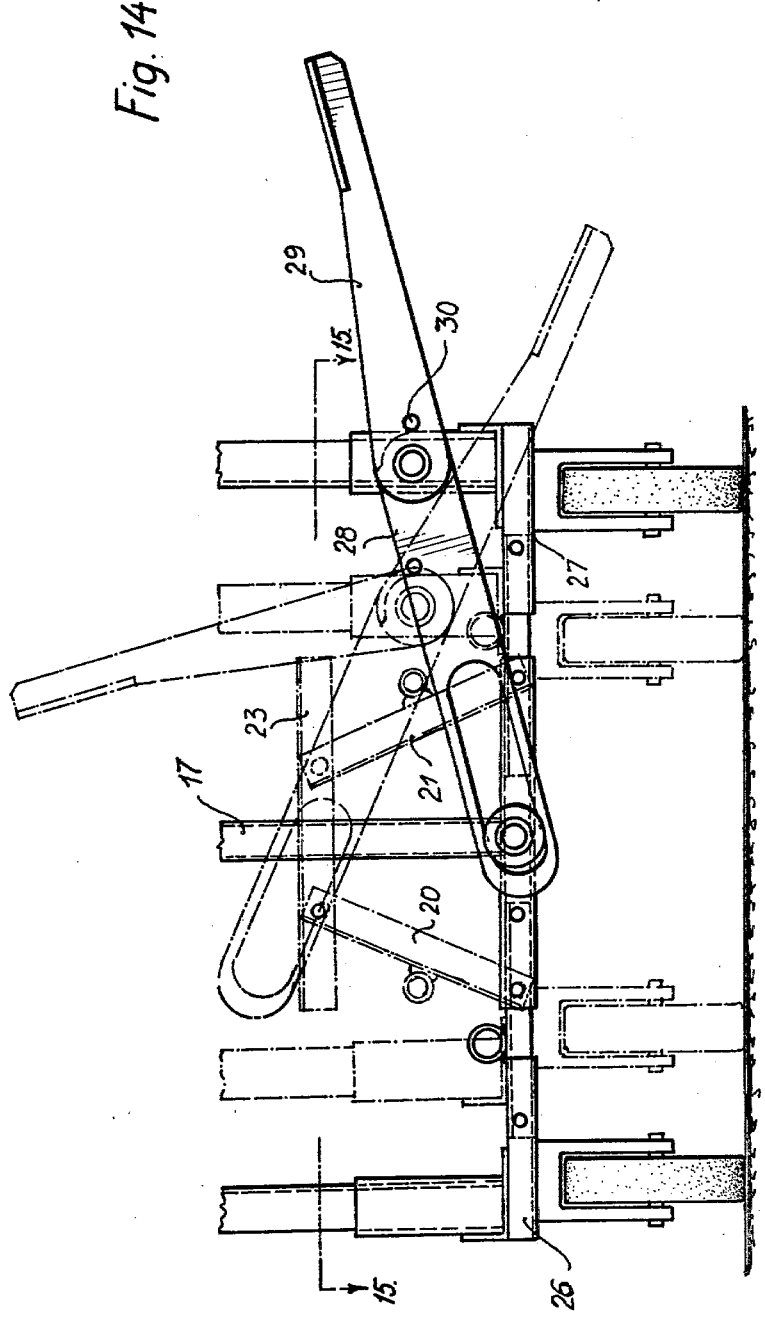
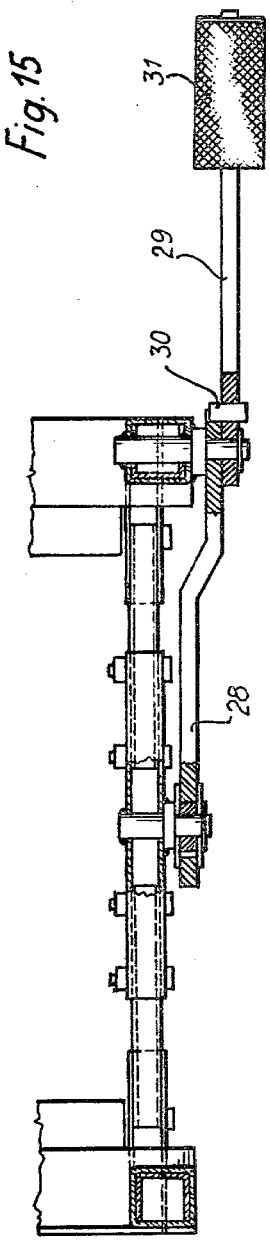

MOVABLE DISTRIBUTION CONTAINER

BACKGROUND OF THE INVENTION

For distribution of potted plants and the like, particularly in covered trucks or lorries, the potted plants or the like are generally packed in suitably big cases of rectangular form, which are placed on shelves in distribution containers or wagons. The containers are wheeled to and loaded on a lorry. After arrival, the containers are unloaded from the lorry and easily rolled away.

In order to use the space of the lorry in the best way, it is often desirable to alter the width of the distribution containers. It is also desirable to dimension the package cases in such a way that they can be placed either in breadth or in length on the shelves, but yet take up the whole width of the container. The system would then also be more flexible and, with a good packing degree, be able to receive different kinds of, for instance, potted plants.

SUMMARY OF THE INVENTION

The purpose of the present invention is to exceedingly realize the above mentioned desires. The invention thus refers to a distribution container for the above mentioned purpose, which is adjustable in breadth within certain limits, which has resulted in considerable improvements regarding the way of loading a room or other space quickly and handily with the largest possible quantity of the goods in question.

The character of the distribution container according to the invention is specifically set forth in the enclosed patent claims.

In order to make the invention and its advantages clearer, some examples of the present invention are described in connection with the enclosed drawings, but it is understood that the invention is not limited to these examples, but that different modifications can be made within the limit of the invention.

BRIEF DESCRIPTION OF THE DRAWINGS

In the drawings,

FIG. 1 shows a container wagon according to a first embodiment of the invention, seen from the side.

FIG. 1a is an enlarged, reversed view of an encircled part of FIG. 1.

FIG. 2 shows the wagon seen from one end and adjusted to its largest width.

FIG. 3 shows the same end view as FIG. 2, but here the wagon is adjusted to its smallest width.

FIG. 4 shows a shelf, consisting of two shelf-halves, seen from above.

FIG. 5 shows one end of a shelf-half with its connection with a corner girder, taken along line 5—5 of FIG. 4.

FIG. 5a is a view according to section A—A of FIG. 5.

FIG. 6 shows one end of a locking iron, which is used to connect the two parts of the wagon between which the distance can be altered.

FIG. 7 shows from above a view of a corner at the bottom part of the wagon, according to a section 7—7 of FIG. 1.

FIG. 8 shows a container wagon seen from the side according to another embodiment of the present invention.

FIG. 9 shows, in a reversed, somewhat larger scale, the encircled part A of FIG. 8.

FIG. 10 is a view along line 10—10 of FIG. 9.

FIG. 13b is a view along line B—B of FIG. 13a.

FIG. 14 shows a modification of the embodiment according to FIGS. 11-13.

FIG. 15 is a view along line 15—15 of FIG. 14.

DETAILED DESCRIPTION OF THE DRAWINGS

Figure 11:
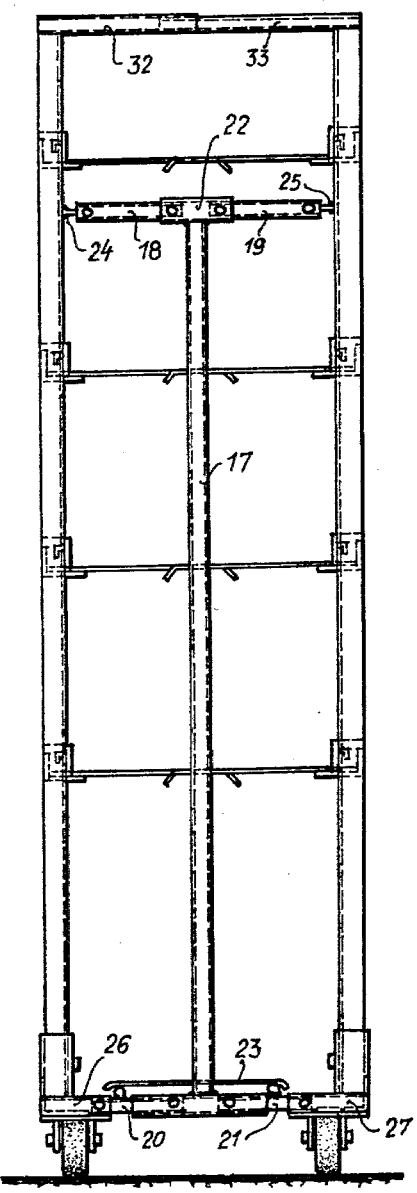
FIG. 11 shows another embodiment of the present invention at its maximum breadth.

The wagon according to the first embodiment or example consists of four corner pillars 11 with U-section and punched keyholes 13, in which pins 12 fitted at the ends of bars 4 of shelf-halves 3, can be pushed in. The shelf-halves are kept in position with the pipes or rods 14 turned inwards to the other half 3, so that the two series of pipes push in interdigitally between each other, more or less depending on the degree of adjustment of the two halves in relation to each other.

The lowest shelf-halves 1 are fixed, suitably by welding, on the mounting plates 9 of the wheels 10, which are attached at the lower ends of the corner pillars. The upper shelves 3 are detachable and movable.

Parts of the wagon are adjustable into different distances from each other. Each adjustable part supports a number of shelf-halves and consists of two corner pillars with wheels, as shown to the right and to the left, respectively, in FIGS. 2 and 3. The relative adjustment is made by one part fitted with two rails 8, attached horizontally on the pillars at about half the height, and fitted with screws in their outer ends, and another part fitted with a rail 7 on the same height with a slot, in which the screws enter, the screws being able to be displaced and be locked in a desired position by means of a wing nut. In order to stabilize the adjustment further, locking irons 5 are fixed under and above the slot construction in both ends. The locking irons are hinged at one end around a pin 2 on a pillar of the one part and at the other end formed as a hook that hooks on a pin 2 on a pillar of the other part. As there are more such pins on different heights, the locking irons can be more or less inclined and thus be adapted to different distances.

Instead of the locking irons 5, it is, of course, possible to arrange two or more slot devices 7, 8 on different heights.

The outer ends of the pipes or rods 14 are bent downwards in order to avoid catching the cases or preventing the moving or displacement of boxes or the like on the shelves.

Instead of making the shelf-halves as comb-formed elements gripped into each other as described above, the shelf-halves could be formed as plates or similar, one of which then having to overlap the other one. The caused difference of level could be compensated by flutes and the like on the surfaces that are not overlapped. A combination of combs and plates is also possible.

FIGS. 8-10 show an embodiment of the present invention where the keyhole formed or cut in the U-profile has been replaced by a rectangular cut 15 and where the pins 12 have been replaced by punched tips 16, which are so formed that they can grip into the openings 15 and hook.

Figure 12:
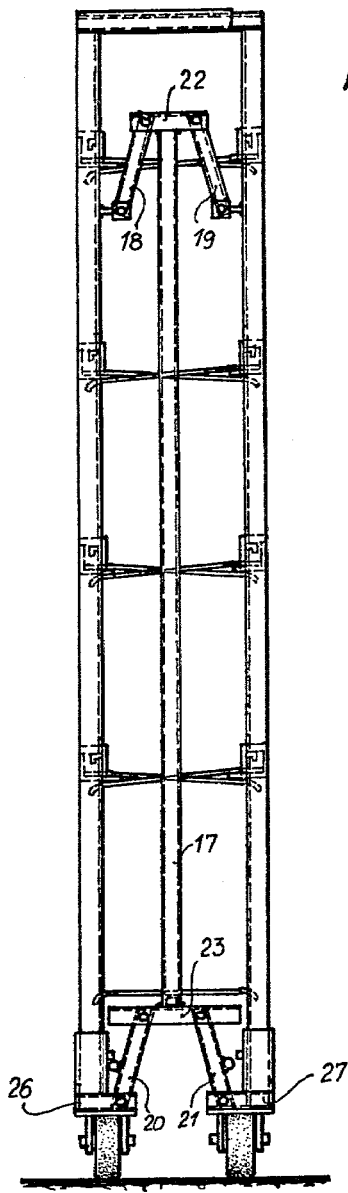
FIG. 12 shows the embodiment of FIG. 11 in its narrowest condition.
Figure 13:
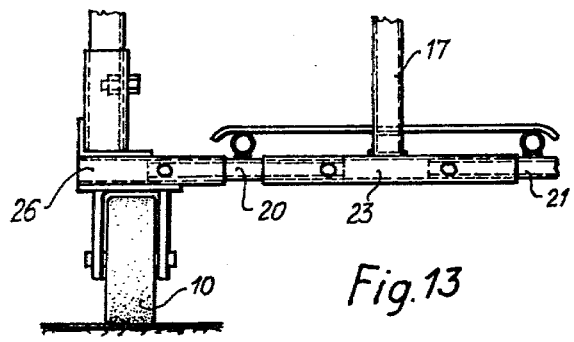
FIG. 13 shows a somewhat enlarged detail picture of a part of the bottom part of the embodiment of FIG. 11.
Figure 13A:
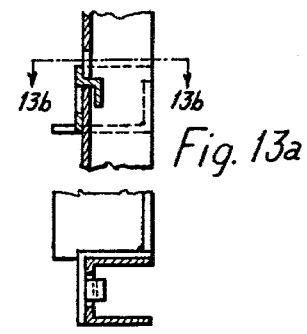
FIG. 13a is an enlarged view of an encircled portion of FIG. 12.
Figure 13B:
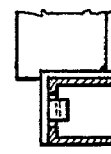

FIGS. 11–13 show an embodiment of the present invention where the width of the shelves can be altered by means of link connections, fixed on upper and lower parts of the container ends. As can be seen from the figures, a first or upper link connection has a central part 22 pivotally connected to proximal ends of turnable links 18 and 19. The distal ends of links 18 and 19 are pivotally connected to projections 24 and 25, respectively, fixed on the U-girders. Similarly, a second or lower link connection has a central part 23 pivotally connected to proximal ends of turnable links 20 and 21. The distal ends of links 20 and 21 are pivotally connected to projections 26 and 27, respectively, fixed on the U-girders. The central parts 22 and 23 are connected with one another by means of an operating rod 17. At the lowest level of the rod 17, the shelf has its largest width, as can be seen from FIG. 11, and, if the rod 17 is brought upwards to its highest position, the links 18, 19 and 20, 21 will swing up and bring the shelf-halves nearer each other so that the shelf will get its smallest width, as shown in FIG. 12.

FIGS. 11–13 also show an alternative design of the lowest shelf. For stabilizing purposes, a couple of bars or the like 32, 33, sliding in each other with clearance fit, have been arranged on top between the both movable shelf parts, which bars stretch between the two couples of corner pillars.

FIGS. 14 and 15 show an example of a further development of the design according to FIGS. 11–13. The operating rod 17 is fitted with a pedal device 28, 29, 31, where the part 28 is flexibly fixed at the bottom part of the rod 17 and also articulated to a point near the foot end of one of the corner pillars. The part 28 is also connected with a lever 29 fitted with a pedal 31 and a locking pin 30 that makes it possible for the pedal to be folded to the shelf when the desired width has been adjusted by means of the pedal. The folding is necessary in order to prevent the pedal and its lever from being in the way of the shelves when these are placed close to each other. The part 28 is fitted with a slot, in which the joint at the operating rod 17 is sliding when the width of the shelf is altered.

I claim:

1. A movable distribution container comprising a frame of generally right-angled parallelepipedic shape and a plurality of juxtaposed shelves supported by said frame, said frame comprising:
   four vertically-extending members defining vertical corners of said frame;
   first means for interconnecting two adjacent members to form a first side of said frame;
   second means for interconnecting the other two members to form a second side of said frame;
   third means for interconnecting said sides of said frame, said third means being adjustable to vary the distance between said first and said second sides; and
   a plurality of wheels forming part of and supporting each side of said frame;
   one of said shelves comprising:
      first and second horizontally-extending members connected at substantially the same heights to said first and said second sides of said frame, respectively; and
      a first and a second series of members having distal ends connected to said first and said second horizontally-extending members, respectively, said series of members having inwardly-facing proximal ends that form a support surface, with the members of the series being interdigitally alternately spaced, the width of the support surface being changed when said third means is adjusted to vary the distance between said first and said second sides.

2. A movable distribution container comprising a frame of generally right-angled parallelepipedic shape and a plurality of juxtaposed shelves supported by said frame, said frame comprising:
   four vertically-extending members defining vertical corners of said frame;
   first means for interconnecting two adjacent members to form a first side of said frame;
   second means for interconnecting the other two members to form a second side of said frame;
   third means for interconnecting said first and said second sides, said third means being adjustable to vary the distance between said first and said second sides; and
   a plurality of wheels forming part of and supporting each side of said frame;
   one of said shelves comprising:
      first and second horizontally-extending members connected at substantially the same heights to said first and said second sides, respectively; and
      a first shelf component and a second shelf component connected to said first and said second horizontally-extending members, respectively, said shelf components having inwardly facing ends, with one of said ends being adapted to overlap the other when the distance between said first and said second sides is reduced by adjustment of said third means.

3. A movable distribution container according to claim 1 or 2 wherein said third means comprises:
   a first and a second pair of cooperating skid rails adjustably interconnecting said first and said second sides with each other, each of said pairs of cooperating skid rails having horizontal members with distal ends connected to respective ones of said vertically-extending members and proximal ends overlapping each other, one of the overlapping ends having a longitudinally-extending groove formed therein and the other of the overlapping ends having a protruding portion mating with said groove;
   means for locking said protruding portions in said grooves thereby fixing the distance between said sides;
   and a plurality of locking irons, each locking iron having one end pivotally connected to a given vertically-extending member of one of said sides and one end notched, the vertically-extending member of the other side adjacent to said given vertically-extending member having a plurality of vertically spaced protrusions positioned thereon, a selected one of which is engageable by said notched end so that said locking iron cooperates with said cooperating skid rails to fix the distance between said sides.

4. A movable distribution container according to claim 1 or 2 wherein said third means comprises:
- link connections fixed at upper and lower parts of each container end, each link connection having outer members with distal ends pivotally connected to portions of the pairs of vertically-extending members and proximal ends facing each other, and a central part pivotally connected to the proximal ends of said outer members; and
- means for simultaneously moving the link connections fixed at each container end comprising:
  - an operating rod extending between the central parts of the link connections; and
  - pedal means for raising and lowering said operating rod, said pedal means being pivotally connected to one of said vertically-extending members and having a first component extending between the operating rod and the pivotal connection and a second component connected to the pivotal connection, the second component being movable between an operative position extending outside of the frame and a retracted position contained within the frame.

5. A movable distribution container according to claim 1 or 2 wherein said frame includes mounting plates for connecting said wheels to said frame, and wherein the lowest of said juxtaposed shelves has two halves rigidly fixed to said mounting plates.

6. A movable distribution center according to claim 5 wherein each of said vertically-extending members includes a plurality of vertically spaced means for supporting said shelves on said frame, shelves positioned above said lowest shelf being adjustable on said vertically-extending members to vary the distance therebetween.

7. A movable distribution center according to claim 1 wherein the vertically-extending members have a generally U-shape and wherein said horizontally-extending members and said series of members have a generally L-shape.

8. A movable distribution center according to claim 1 wherein the proximal ends of each of said series of members are downwardly bent.